J. W. LYNCH.
GLASS BLOWING MACHINE.
APPLICATION FILED SEPT. 28, 1916.

1,297,706.

Patented Mar. 18, 1919.
9 SHEETS—SHEET 2.

Fig. 2.

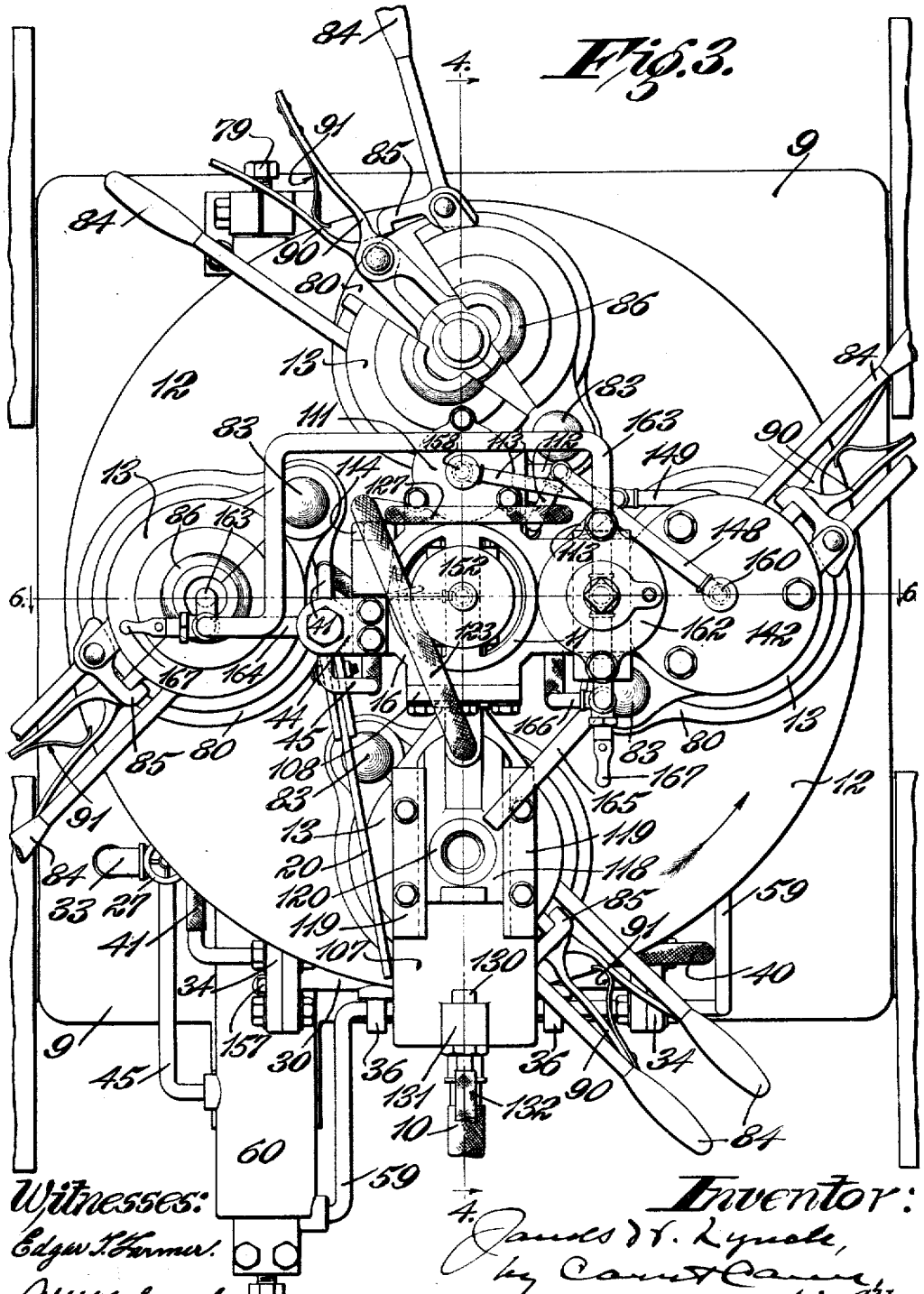

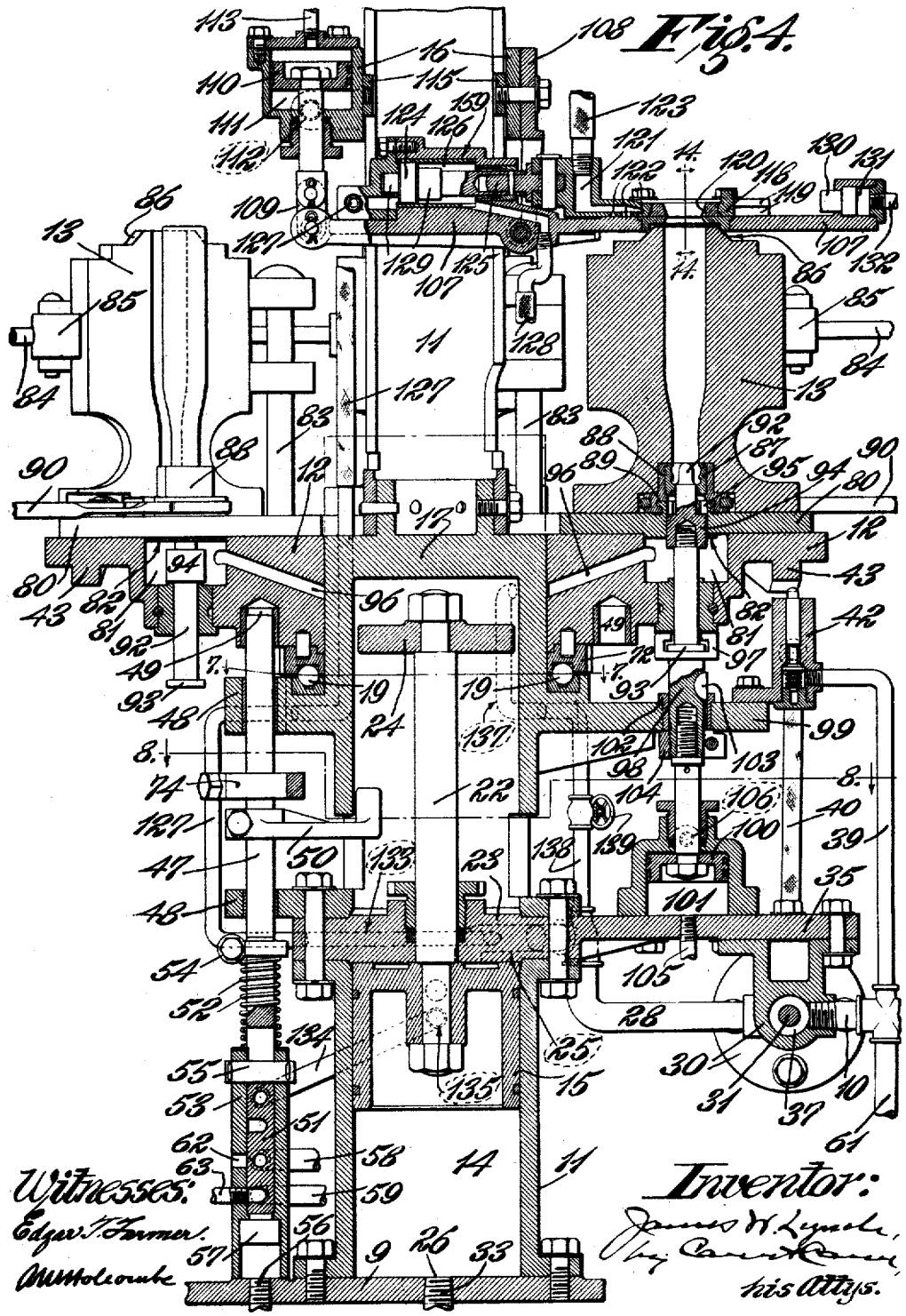

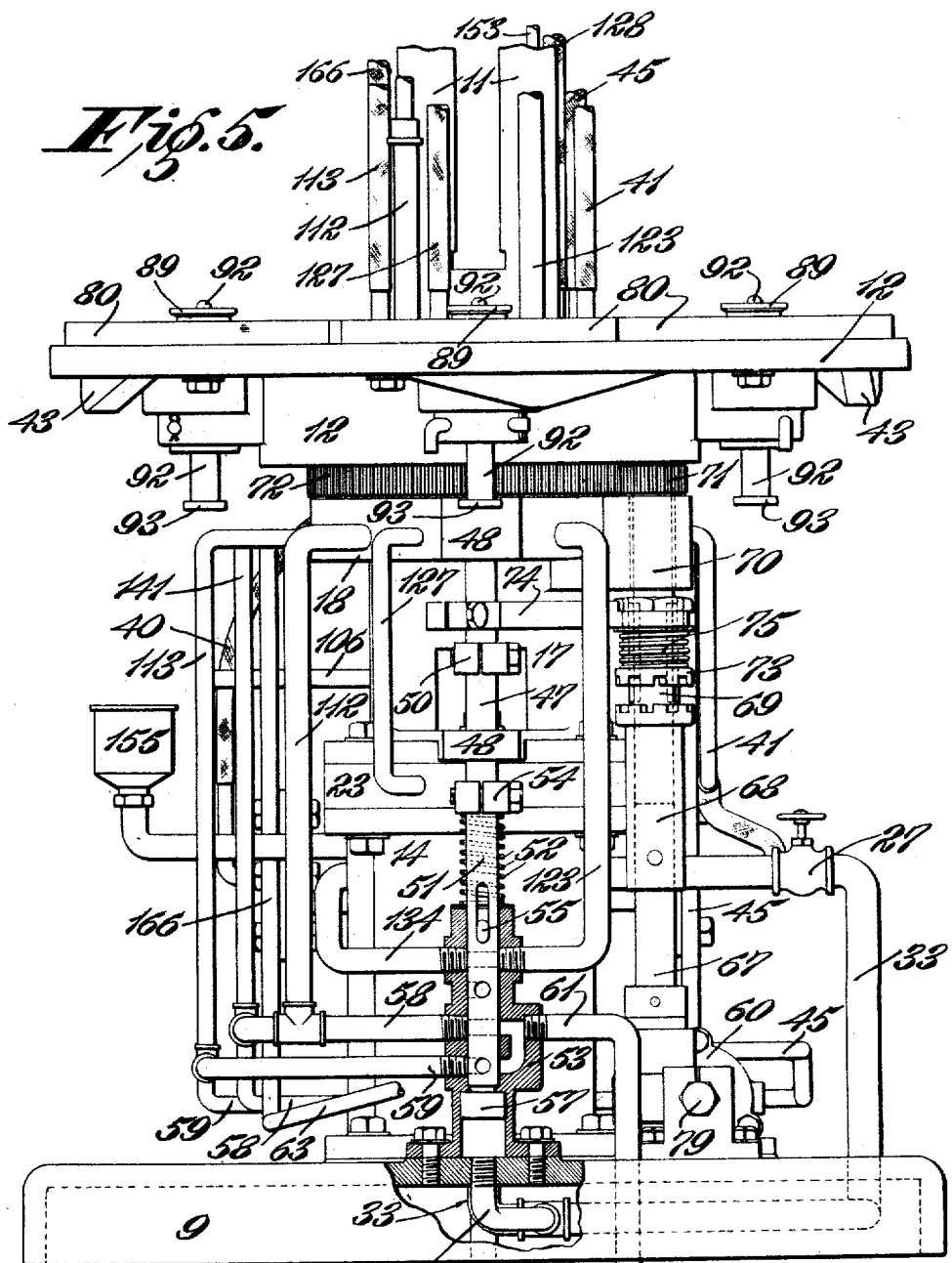

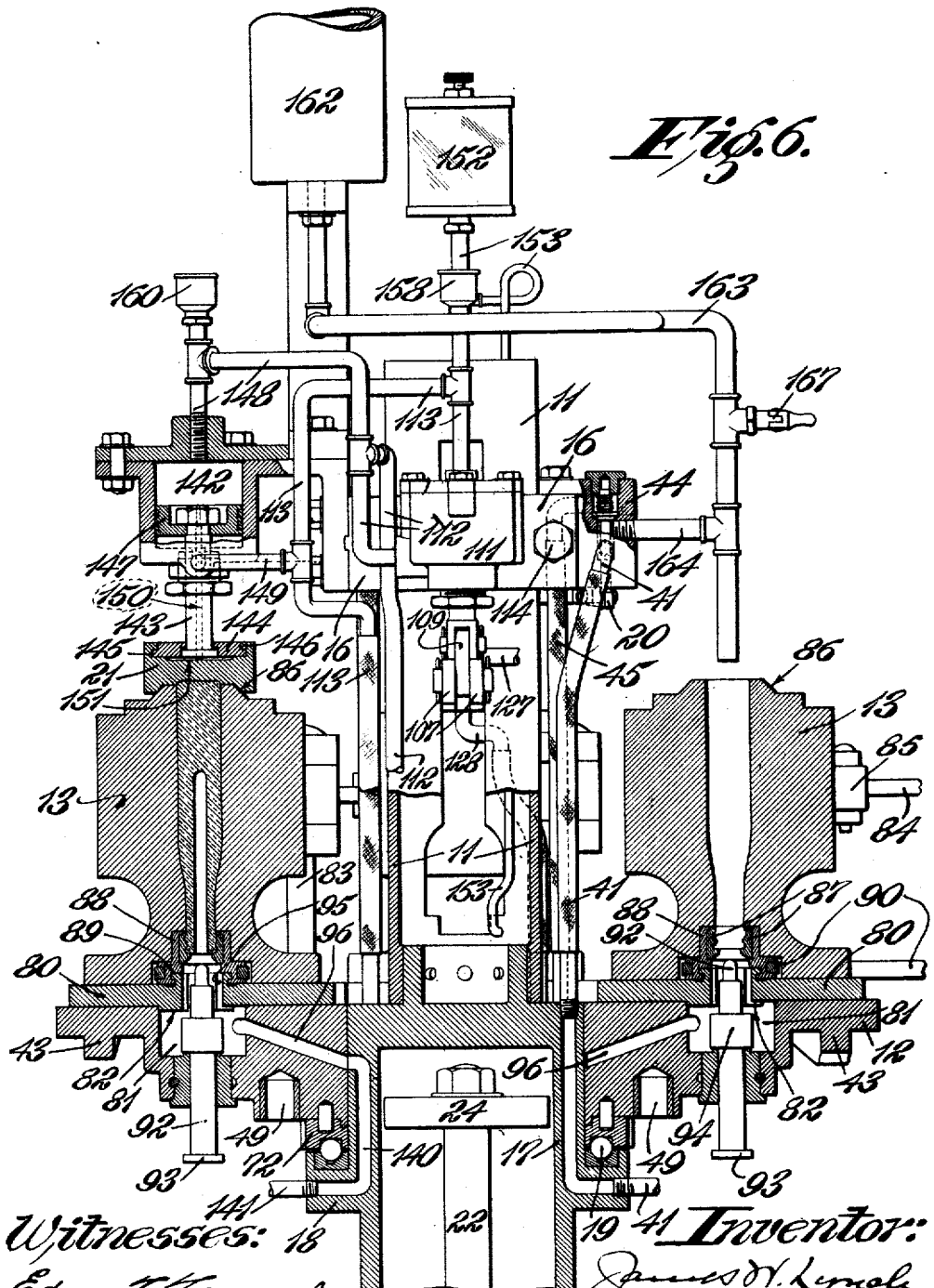

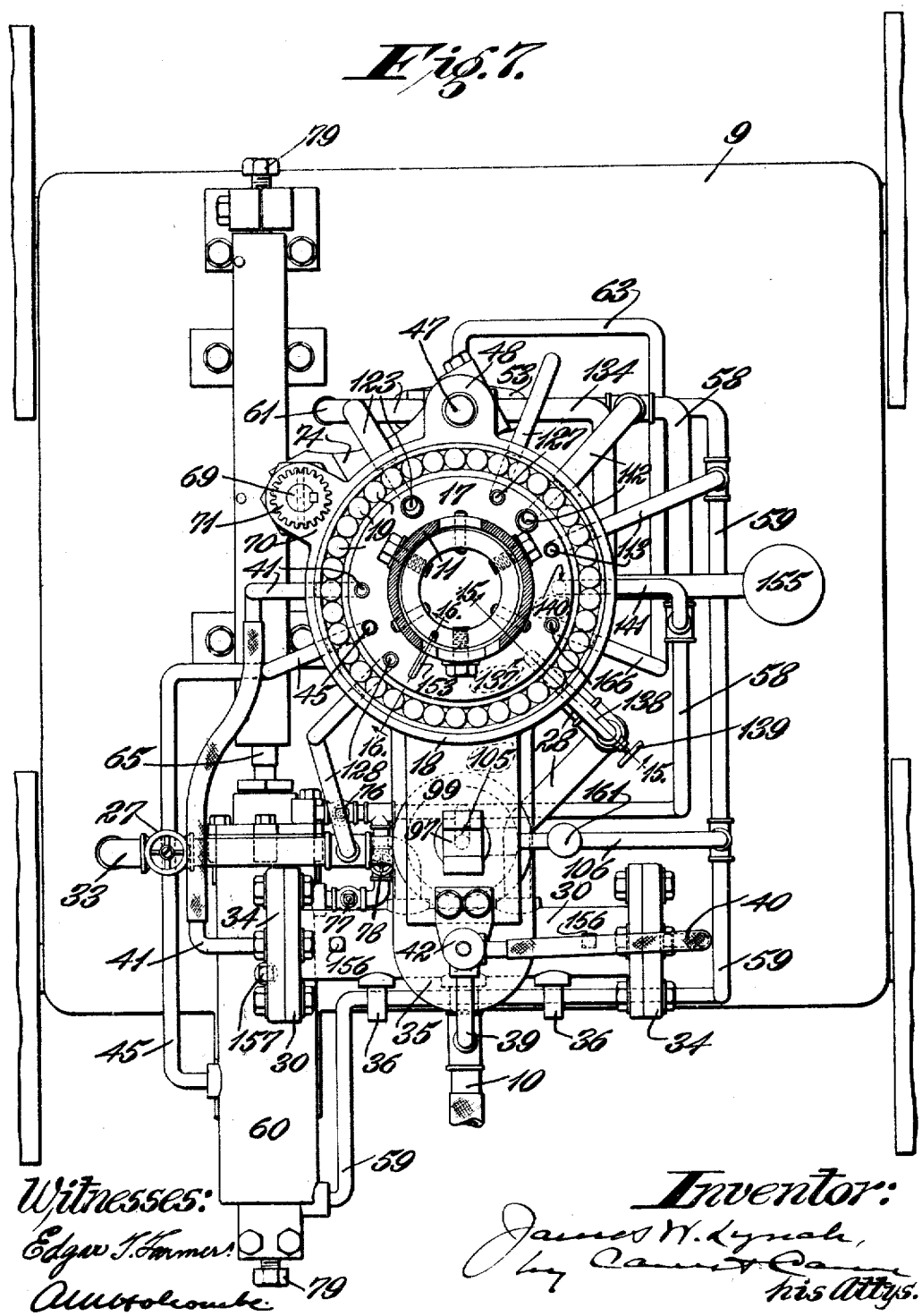

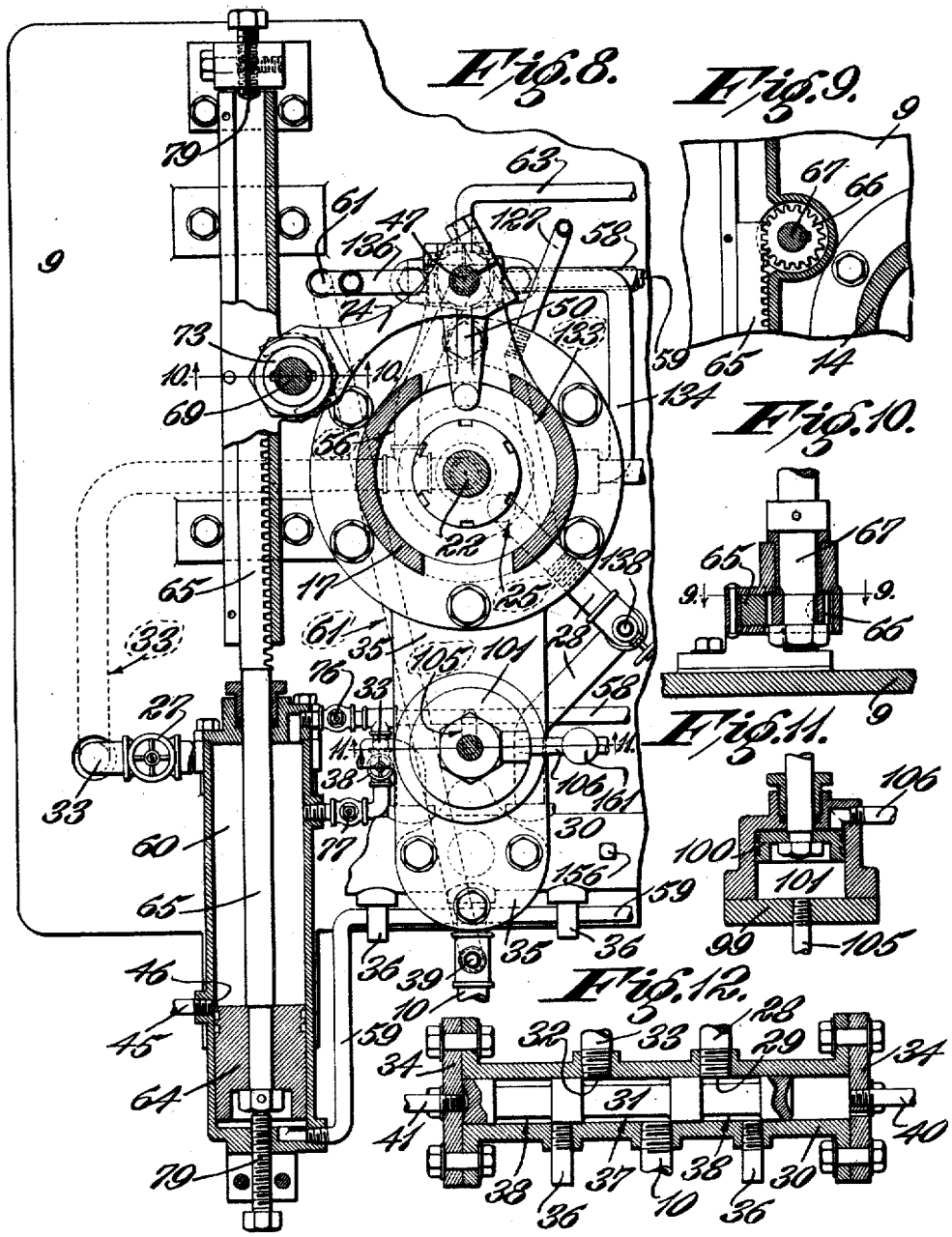

J. W. LYNCH.
GLASS BLOWING MACHINE.
APPLICATION FILED SEPT. 28, 1916.
1,297,706.
Patented Mar. 18, 1919.
9 SHEETS—SHEET 9.
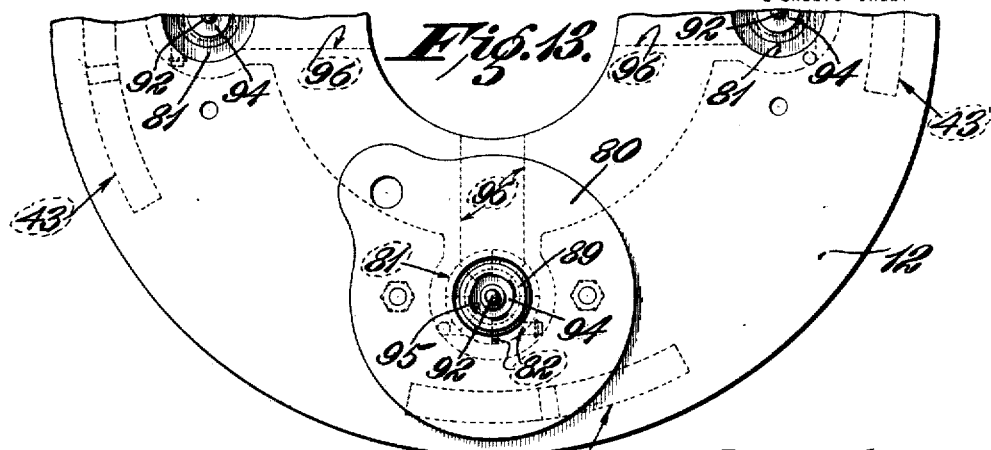
Fig. 13.
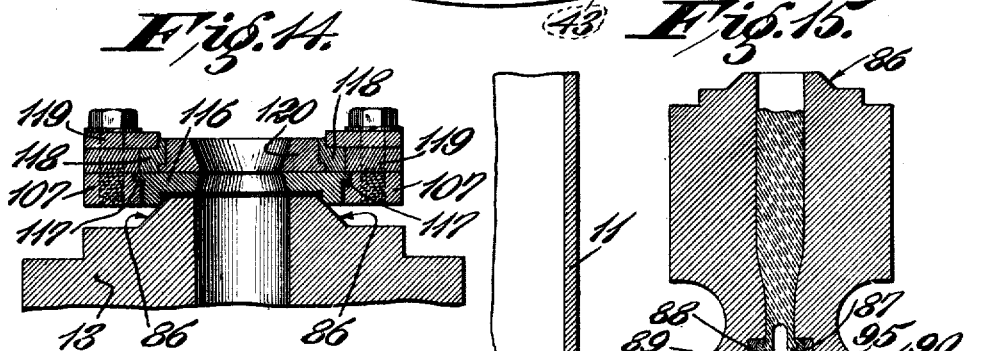
Fig. 14.   Fig. 15.
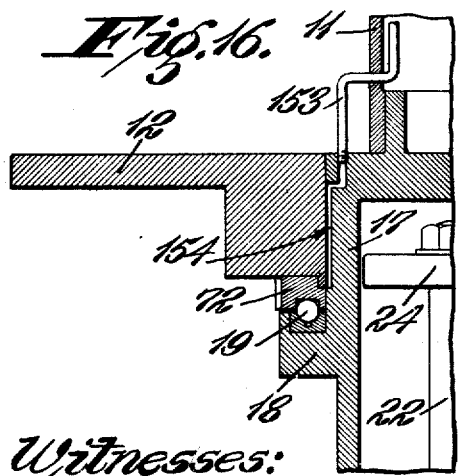
Fig. 16.
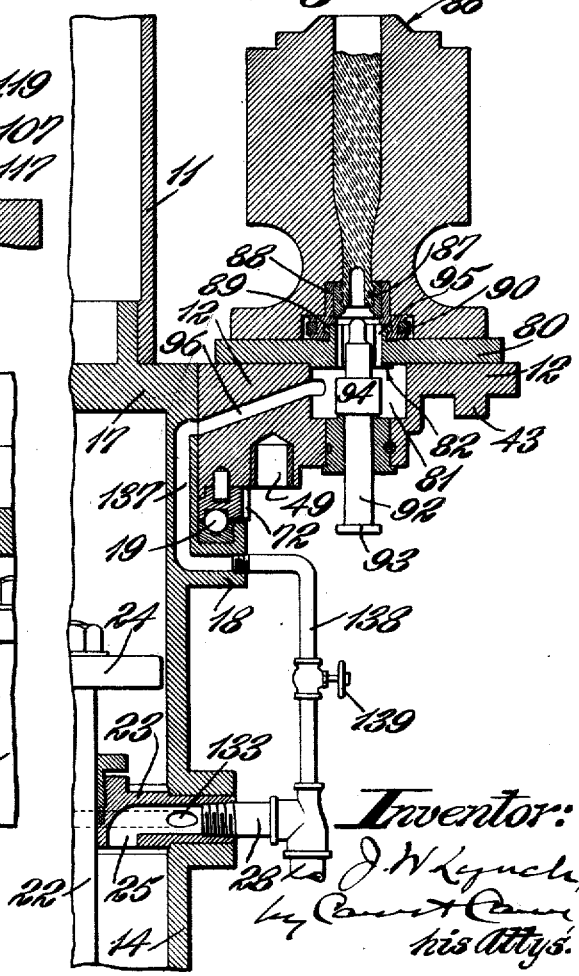
Witnesses:
Edgar T. Furmer
A M Holcombe
Inventor:
J W Lynch
by Cannot Cann
his attys.

UNITED STATES PATENT OFFICE.

JAMES W. LYNCH, OF EAST ST. LOUIS, ILLINOIS, ASSIGNOR TO OBEAR-NESTER GLASS COMPANY, OF ST. LOUIS, MISSOURI, A CORPORATION OF MISSOURI.

GLASS-BLOWING MACHINE.

1,297,706.   Specification of Letters Patent.   Patented Mar. 18, 1919.

Application filed September 28, 1916. Serial No. 122,658.

*To all whom it may concern:*

Be it known that I, JAMES W. LYNCH, a citizen of the United States, and a resident of the city of East St. Louis, in the county of St. Clair and State of Illinois, have invented a new and useful Improvement in Glass-Blowing Machines, of which the following is a specification.

This invention relates to semi-automatic and automatic machines for molding hollow glass articles, particularly narrow neck bottles, such as wine and beer bottles, prescription bottles for druggists, and the like. In machines of the type to which the invention relates, the molds are carried upon a revolving table which operates intermittently to bring one after another into the successive positions or stations for performing the various operations upon the molten glass to form it into a blank.

The object of the invention is to provide suitable devices operated by means of air pressure and suitable controlling means whereby first, the "gather" or charge of glass in the mold is cut off and compacted in the mold; and then the mold is successively brought to different positions and is subjected to the action of air under pressure for the purpose of blowing and expanding the molten glass to fill the mold and form a hollow blank, all of the operations being performed automatically except charging the glass into the mold and removing the finished blank from the mold.

It is an object of the present invention to mount the entire mechanism in a simple and compact machine of portable form having means for making ready for and performing automatically all of the operations required for the formation of a perfect blank after the glass is placed in the mold; a further object is to strengthen the construction and to make certain the continuous oiling and cooling of the wearing parts of the machine to avoid delays in operation; and to cushion the reciprocating parts whereby the blanks may be quickly and accurately formed, and the loss from defects or breakage due to shocks and lack of uniform dexterity in manual operations is reduced to the minimum.

A further object is to simplify the arrangement and connections to the automatic air operated devices by mounting the mold supporting table on a fixed central pedestal in which are arranged air passages and ports designed to direct air to different points for producing different and successive operations; and to control the operation of said devices and the rotation of the table upon the pedestal by means of a regulating device arranged for operation in the pedestal, the regulator serving to control the action of the air pressure to synchronize the movements of the parts and regulate the speed of operation of the machine to suit the work.

Another object is to provide improved means for allowing air to pass from between the molten glass in the blank mold and the bottom of the mold, thus to prevent the formation of an air cushion which would interfere with the proper shaping of the blank within the neck mold. Another object of the invention is to provide means for preventing the collapsing of the partly formed hollow blanks in the molds.

Other objects of the invention are to provide a combined cutter and blow head and automatic means under the control of the workman for operating it, said cutter and blow head being mounted on a funnel set on and sealing the top of the adjacent mold and clamped down to prevent the escape of air under pressure therefrom, and being so arranged that immediately following the severing of the gather deposited in the blank mold, air under pressure is admitted through the blowhead to the mold to pack the molten glass within the mold; and further, to provide means automatically controlled whereby, when the glass is properly packed in the mold, the combined cutter and blow head is immediately withdrawn from active position and the funnel is simultaneously raised out of engagement with the blank mold, to permit the mold to be shifted without delay from one position to another in carrying out the successive steps in the formation of the blank.

A further object is to provide a novel form of latch for holding the table in any one of its active positions, and means coöperating therewith and regulated and controlled by a suitable timing device for rotating the table from one position of rest to its next position of rest and locking it automatically.

Another object is to provide improved means for retracting the neck pins from the blank molds after the metal has been packed within the mold and prior to the final blowing of the blank within the blank mold.

With the foregoing and other objects in view, which will appear as the description proceeds, the invention resides in the combination and arrangement of parts and in the details of construction hereinafter described and claimed. The device shown in the drawings illustrates the preferred form of the invention; but it is contemplated that changes in the precise construction and arrangement of the parts of the device herein disclosed can be made to conform to the particular product desired, and to suit the conditions of use.

The accompanying drawings show a machine embodying the preferred form of the invention as applied to molding blanks for bottles. In said drawings, wherein the same reference characters are used to designate the same parts in the several views, Figure 1 is a front view of the machine, illustrating the relative positions of the parts in normal position ready for the gather to be dropped into the blank mold in the first operating position (the front mold in the center of the figure). The mold at the left of the figure is empty, awaiting the turning of the table to bring it to operating position, and the mold at the right hand of the figure is clamped ready for blowing the blank in the second operating position;

Fig. 2 is a left side elevation of the machine shown in Fig. 1, the blank mold in the first operating position being shown at the right of the figure, and that at the left side of the figure being shown for the removal of the completed blank, the operating parts being shown in their normal position as in Fig. 1;

Fig. 3 is a plan view of the machine, showing the molds and operating parts in the same positions as in Figs. 1 and 2;

Fig. 4 is an enlarged vertical section on the line 4—4 in Fig. 3, taken through the axis of the combined shear and blow head, showing the parts in position to receive a gather in the right hand blank mold (first operation position), and a finished bottle blank in the left hand mold, which is shown open, the blow head being shown prior to its shearing movement;

Fig. 5 is a back view of the lower portion of the machine, showing the table lock rod valve in section;

Fig. 6 is a part back view and part vertical section on the line 6—6 in Fig. 3, showing the middle and upper portion of the machine, the section being taken through the axis of the second or blowing position, the parts being shown in their normal positions as in Figs. 1 to 5, inclusive, after the table has rotated and the table trip has operated to position the parts for blowing;

Fig. 7 is a horizontal section on the line 7—7 in Fig. 4, the rotating table being removed, showing the table operating cylinder and valves in plan;

Fig. 8 is a horizontal section on the line 8—8 in Fig. 4, showing the top of the housing for the rack partly removed and the table operating cylinder in section on its axis;

Figure 1:
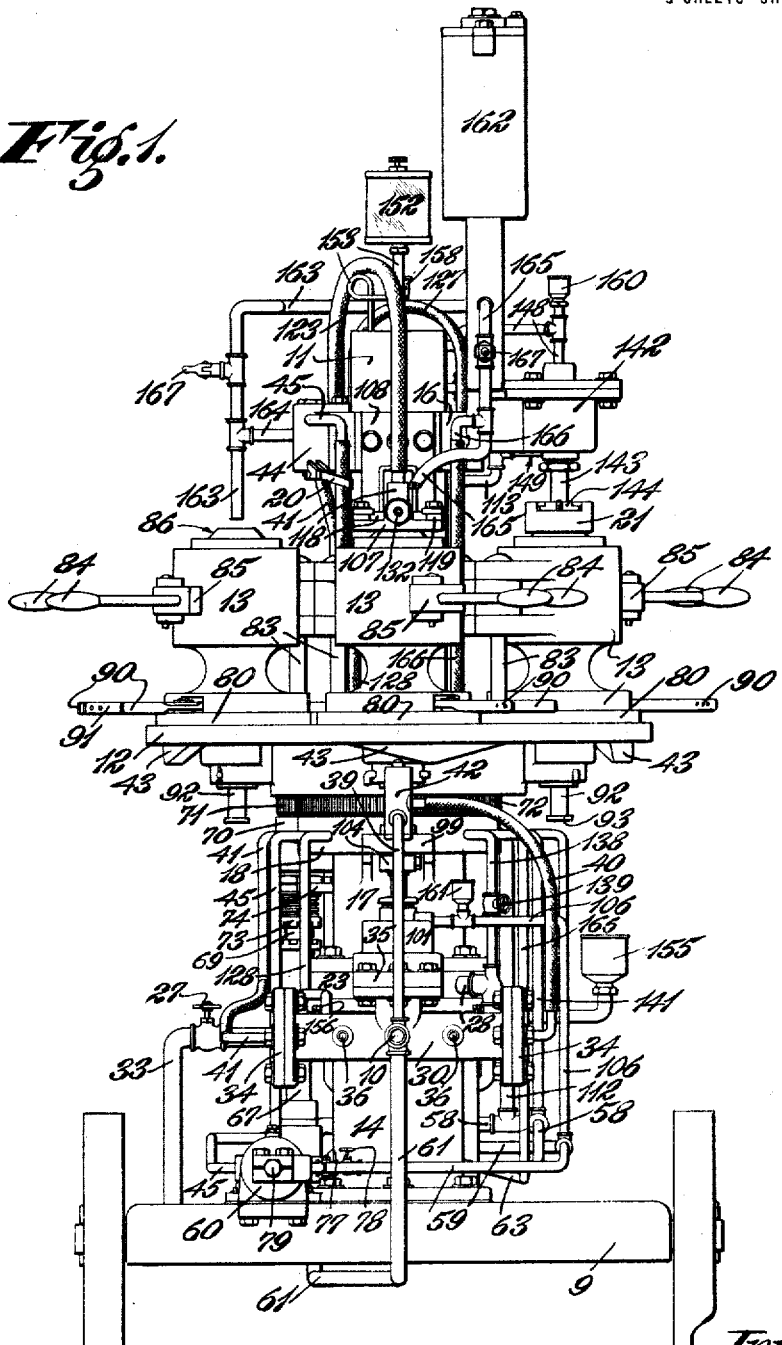

Figs. 9 and 10 are a horizontal section and a vertical section through the rack and gear arrangement for rotating the table rotating shaft, taken on the line 9—9 in Fig. 10 and the line 10—10 in Fig. 8, respectively;

Fig. 11 is a vertical section through the cylinder for lifting and lowering the neck pin, taken on the line 11—11 in Fig. 8;

Fig. 12 is a horizontal axial section through the main valve;

Fig. 13 is a half plan view of the table, showing one mold plate in place thereon, the molds and the other mold plates being removed;

Fig. 14 is a cross-section through the funnel arm and cross slide on the line 14—14 in Fig. 4, drawn to a larger scale;

Fig. 15 is a vertical section through one side of the table and mold, and a portion of the pedestal below and above the table, on the line 15—15 in Fig. 7, the table being rotated half way from the first to the second operating position; and Fig. 16 is a vertical section through a portion of the intermediate section of the pedestal and table, on the line 16—16 in Fig. 7, showing the oil pipe and oil groove for lubricating the table bearing.

For convenience in handling the machine, it is mounted on a wheeled base 9 and is supplied with compressed air from a suitable source through a main supply pipe 10. From the middle of the base rises a pedestal 11 which supports a rotatable table 12 carrying four molds 13. This pedestal is hollow, and is made of sections, which are bolted together one over another. The base section contains a cylinder 14 for the piston 15 which controls the operating devices, and the upper section is in the form of a column upon which is clamped the head frame 16 for adjustment up and down to suit molds of different heights. Interposed between the base section and the top column section is an intermediate hollow section having a head 17 which is provided with a grooved flange 18 around it for the ball bearing 19 which supports the table. The lower cylinder 14 and its head, and the head 17 and table 12, have air ports and passages in them for connecting the control valves below the table with the operating devices mounted on the column above the table, and for directing and controlling the air which blows the blanks, as hereinafter described.

General statement of operation of the machine.

In the machine shown in the drawings there are four molds 13, and the table 12 has four operating positions. The mold in the first operating position (the front position in Figs. 1 and 3, and the right hand position in Figs. 2 and 4) is closed, and is partly filled with the "gather" of glass from a punty rod manipulated by the workman. When the proper amount of glass has been charged into the mold, the workman trips an air valve by dropping the punty rod on the lever 20, which starts the automatic working of the machine. The "gather" is immediately cut off automatically, and air is blown into the top of the mold to force the "gather" into the neck of the mold and pack it evenly in the mold in form of a blank; following which the table rotates automatically ninety degrees toward the right (as shown by the arrow in Fig. 3) to bring the mold into the second operating position (the right hand position in Figs. 1 and 3, and the left hand position in Fig. 6); and upon completing its turning movement the table trips a valve to stop the automatic operation of the machine and return all of the operating devices to normal position. While passing from the first to the second positions the blank is partially blown and prevented from collapsing by air admitted into it through its neck.

In the second operating position the blank is fully blown to fill the mold while the operating parts are being returned to their normal positions, a baffle plate 21 being clamped over the open top of the mold to form the bottom of the blank. Upon the workman tripping the lever 20 for making a second blank, the table is again rotated automatically to bring the first mold into the third operating position, where it is opened by another workman, and the fully blown blank, is removed; following which the mold is closed again by the workman. Another rotation of the table through ninety degrees, following the next pressing down of the punty trip lever 20, brings the first mold into the fourth operating position, where air and oil vapor are blown into the open top to cool and lubricate it. This treatment prepares the mold to be carried into the first operating position by the next rotation of the table ready for another cycle of operations.

Automatic timing device and speed regulator.

Regulation of the speed of operation of the machine is effected by means of a piston 15 which is slidable vertically in the base cylinder 14. The piston has a stem 22 which extends through the cylinder head 23 into the space within the intermediate section of the pedestal, and carries a disk 24 on its upper end. This disk operates the table latch and also the multiple valve which controls the operation of the table operating cylinder and the cylinders for operating the automatic devices which coöperate with the molds in their several operating positions, as hereinafter described. The cylinder 14 has a port 25 in its top end and a port 26 in its bottom, for supplying air to move the piston 15 down and up.

The proper time intervals between the movements of these several automatic devices for effecting the various operations which are performed successively upon a blank are insured by the time necessary for the large piston 15 to complete its stroke, which may be controlled by properly adjusting a control valve 27 in the air pipe 33 leading from the port 26 in the bottom of the cylinder 14. The control valve 27 regulates the speed of operation during the downward movement of the piston 15 by throttling the exhaust from the lower end of the cylinder; hence the air pressure in the top of the cylinder may be regulated to suit the blowing pressure desired for the particular blanks being made without much affecting the speed of operation.

Main operating valve.

The upper port 25 of the cylinder 14 is in communication through an air pipe 28 with a port 29 in the side wall at the right hand end of the casing 30 of the main operating valve 31. The lower port 26 of the cylinder 14 is in communication with a port 32 in the side wall at the left hand end of the operating valve casing 30 through an air pipe 33 which extends through the base 10.

The casing 30 of the main operating valve is of cylindrical form with its ends closed by oppositely arranged heads 34. The valve casing 30 is mounted on a bracket 35 on the front side of the cylinder head 23, which is bolted between the lower and intermediate sections of the pedestal 11. The main air supply pipe 10 leads from a suitable source of compressed air to the middle of the front side wall of the valve casing. The valve casing 30 is also provided with two exhaust ports 36 leading to the atmosphere, arranged one on each side of the air supply inlet pipe. The main valve 31 is a long piston having a central groove 37 and two end grooves 38. It is freely movable in the casing 30, and it may be thrown to one or the other end of its stroke by air pressure applied through either of the pipes 40 and 41 leading to the heads 34 of the valve casing. The middle groove 37 provides a passage from the air supply 36 to one or the other of the ports 29 and 32 for admitting air to the lower cylinder 14 to move the piston 15 either down or up; and the end grooves 38 provide a passage from one or the other of the ports 29 and 32 to the adjacent exhaust port 36.

Normally the valve 31 is thrown to the left, as shown in Fig. 12, to open the port 32 to air pressure and the port 29 to the atmosphere to hold the piston 15 at the top end of its stroke. Air for throwing the valve into normal position to raise the piston is supplied to the right end of the valve casing through the pipes 39 and 40 from the air supply pipe 10 whenever the table trip valve 42 is operated. The table has four lugs 43 on its under side for operating the trip valve 42 at the end of each rotation of the table. Air for throwing the valve 31 to the right to cause the piston 15 to move down may be admitted to the left-hand end of the casing through the pipe 41 by opening the punty trip valve 44 on the head frame 16, which is accomplished by the workman by depressing the lever 20 with his punty rod. Air is supplied to the punty valve 44 through the air pipe 45, which in turn is supplied from a port 46 in the side of the table operating cylinder 60 near its head end which is covered and closed by the table operating piston when the table starts to move. While the operating parts are returning to normal position there is no pressure in the head end of the cylinder 60, and so depressing the lever 20 during the return stroke of the table operating piston does not move the main valve. This arrangement prevents the accidental operation of the valve 44 to move the main valve 31 except when the parts are all in normal position.

Table turning mechanism.

The table 12 is normally held stationary by a latch rod 47, which is controlled by the regulator piston 15. Two lugs 48, arranged in vertical alinement one over the other, extend radially from the back side of the intermediate section of the pedestal 11 near its top and bottom ends for supporting and guiding the latch or locking rod 47. The upper end of the locking rod is adapted to enter one of the four holes 49 in the lower side of the table for securing it against rotation in any one of its several operating positions.

An operating arm or lever 50 is adjustably clamped upon the rod 47, and extends through a slot in the back side of the intermediate section of the pedestal near its bottom. The operating arm 50 has a finger on its inner end which is adapted to be engaged and moved down by the disk 24 at the lower end of the down stroke of the piston 15. The latch or locking rod 47 is slidably mounted for vertical movement, and its lower end rests upon the upper end of the stem of a vertical plunger valve 51. A coiled spring 52 is mounted on the stem of the valve 51 and bears at one end upon the top of the valve casing 53 and at its other end against an adjustable collar 54 on the valve stem to help support the valve and locking rod 47 normally to lock the table.

A flat pin 55 secured in the top of the valve casing 53 projects through a slot in the valve stem and limits the vertical travel of the valve and prevents it from turning in the casing. A pipe 56 leads below the base 9 from the pipe 33 to the lower end of the casing 53 and opens underneath a piston 57 arranged under the end of the plunger valve 51; so that when air is admitted from the main valve 31 to raise the piston 15, part of this air will lift the piston 57 and plunger valve 51 to insure the quick return of the latter to normal position.

The valve casing 53 is mounted on the base 9 and has a pair of outlet ports in its side wall which are connected to pipes 58 and 59 arranged one over the other, as shown in Fig. 5. The upper pipe 58 leads to the back end of the horizontal cylinder 60 which operates the table rotating mechanism; and the lower pipe 59 connects with the front or head end of the cylinder 60. The valve casing 53 of the plunger valve has an air pressure supply pipe 61 opening into a chamber in its front wall opposite the pipes 58 and 59. The side of the valve casing 53 is provided with an exhaust port 62 leading to the atmosphere, and an outflow pipe 63 for operating the oil spray which is blown on to the cutter by means of the exhaust from the head end of the table turning cylinder.

The ports in the plunger valve 51 and casing 53 are so arranged that when the valve is in its normal raised position with the locking rod pressed upwardly by the spring 52, the air pressure supply pipe 61 is in communication through a hole through the valve with the pipe 58 to the rear or stuffing box end of the table rotating cylinder 60; and the outflow pipe 63 is in communication through a hole through the valve with the exhaust from the front end of the cylinder through the pipe 59. When, however, the valve 51 is moved down out of its normal raised position by the downward motion of the locking rod 47, communication between the air supply pipe 61 and the pipe 58 leading to the rear end of the table rotating cylinder is closed and the pipe 58 is opened to the atmosphere through a recess in the valve registering with the exhaust port 62. Simultaneously communication is opened through a hole in the valve between the air supply pipe 61 and the pipe 59 leading to the head end of the table operating cylinder to move the piston 64 for rotating the table.

The piston 64 in the table rotating cylinder has a rod 65 projecting through the stuffing box on its rear end, and this rod is guided in a casing and provided with rack teeth on one side which mesh with the spur gear 66 on the lower end of the vertical shaft 67 (see Figs. 8, 9 and 10). The upper end of the vertical shaft 67 carries a rotatable sleeve 68 in which an upper shaft 69 is journaled. The upper end of the shaft 69 is supported in a bearing 70 on the side of the flange 18 of the pedestal and has a spur gear 71 on its top end, which is in mesh with the large ring gear 72 secured on the under side of the table.

The sleeve 68 has a series of teeth on its upper end and may be connected to rotate the upper shaft 69 by means of a movable clutch member 73 operated by an arm 74 which is secured to the latch rod 47, and which holds the clutch out of engagement when the latch rod is raised. A spring 75 between the arm and clutch sleeve permits the latch rod to drop without moving the sleeve in case the clutch is not in position to engage immediately, in which event the clutch will drop into engagement when the shaft 67 starts to turn. The clutch 73 is normally out of engagement with the sleeve 68, but when the latch rod drops to unlock the table and operate the table turning cylinder the clutch is thrown into engagement to turn the table. When the latch rod is raised to lock the table and move the plunger valve 51 to return the table turning piston to its normal position at the front end of the cylinder 48, the clutch 73 is thrown out of engagement and the shaft 67 rotates idly without turning the table.

The pipe 58 has two branches near its junction with the cylinder 60, one leading to the rear end of the cylinder and the other to a port in the side of the cylinder near its rear end. A check valve 76 permits air to pass through the branch leading to the rear end of the cylinder, but prevents passage of air from the cylinder except for a vent which permits a little air to pass through slowly. This arrangement causes the table and its operating parts to slow down toward the end of the table turning stroke, and also prevents the piston from slamming in the cylinder at the end of its stroke. A check valve 77 prevents passage of air into the cylinder but permits air to pass out of the cylinder through the branch from the port in the cylinder near its rear end. A valve 78 in the branch is provided for throttling the exhaust from the cylinder and thus controlling the speed with which the table is rotated. No anti-slamming device is required at the end of the return stroke.

Adjustable screw stops 79, arranged one in the front end of the cylinder and one in an abutment on the base 9 at the end of the stroke of the piston rod 65, serve to regulate the length of stroke of the piston to turn the table from one operating position through exactly the angle to bring it into the next operating position.

*Mold construction.*

The molds rest upon plates 80 which are bolted to the table over the recesses or air chambers 81 therein. The mold plates have holes through their middles, and lugs 82 circularly arranged around the holes on the under sides of the plates fit in the respective recesses 81 in the table to center the molds. The recesses 81 are circular, and have holes in their bottoms extending through the table. Each mold is split vertically into two parts which are hinged together at their rear edges by a hinge pin 83. The lower end of the hinge pin projects into a suitably located hole in the plate 80 for maintaining the two parts of the mold in proper alinement on the mold plate. The front edges of the halves of each mold are provided with handles 84, and the halves of the mold are held together by a latch 85 upon one of the handles 84 which is pivoted to the mold. The molds are shaped within to the outline of the desired blank, being open at the top and growing smaller toward the bottom to conform to the size of the neck of the bottle. The top end of the mold is flat, with a conical portion or beveled shoulder 86 surrounding it for coöperating with the filling funnel and the baffle plate in its operating positions, as hereinafter described.

The lower portion of the mold is counterbored to receive the two part neck ring 87 and neck ring holder 88. The neck ring is shaped to form the beaded end of the bottle neck, and its two parts are each secured in one of the halves of the split neck ring holder 88. The neck ring holder has an annular groove inside of its lower end which embraces a central flanged ring 89 on the top of the mold plate 80 to retain the neck ring in alinement with the recess 81 and hole through the table 12. The neck ring holder is provided with tongs 90 for opening it when it is desired to remove a blank from the mold. Each half of the neck ring holder is secured to one jaw of the tongs, and a spring 91 normally holds the tongs and neck ring holder in closed position. Clamping the mold 13 shut also clamps the neck ring holder around the flanged ring 89, and thereby centers both the neck ring and mold on the table.

*Neck pin construction and operating means.*

The neck ring 87 has a center hole through it alining with the hole in the table in the bottom of the recess 81, and a neck pin 92 is vertically arranged in the hole at each mold position with its upper end projecting up out of the recess in axial alinement with the axis of the neck ring and mold. The neck pins 92 are slidably mounted in the holes in the table, and their lower ends project down through the table and have flanges 93 for coöperating with the automatic means for operating them, as hereinafter described. The neck pins have collars 94 intermediate their ends upon which they hang in the recess in the table with their upper ends normally positioned immediately below the neck rings 87. The upper ends of the neck pins are smaller than the holes in the neck rings, and when a neck pin is lifted the collar 94 serves to guide it in the mold plate 80 and thereby center it in the neck ring. Grooves 95 in the sides of the center hole in the mold plate permit the escape of air from the mold past the raised neck pin into the recess 81. Passages 96 connect these recesses with the middle hole through the table.

The neck pins are raised in the first operating position (the right hand position in Fig. 4) by means of a yoke 97 on the upper end of a vertically movable rod 98 which is slidably mounted in a bracket arm 99 on the front side of the intermediate section of the pedestal 11. The rod 98 has a piston rod and piston 100 secured to its lower end, the piston working up and down in the cylinder 101 which is mounted on the top of the bracket 35 which supports the main valve casing 30. The yoke 97 is shaped to embrace loosely the flange 93 on the lower end of the neck pin, and is held in proper vertical and angular position to permit the flanged lower end of the neck pin to enter and leave it as the table rotates. The yoke is supported and guided by a collar 102 mounted in the bracket arm 99. The collar is provided with a keyway for the key 103 in the side of the yoke rod 98 to slide in. Normally the yoke is down, resting on the collar 102, and in its lowest position the flanged lower ends 93 of the neck pins, also in their lowest position, can enter and leave it freely. An adjustable clamp ring 104 is secured on the rod 98 below the bracket arm for adjusting the height to which the piston can move the yoke and neck pin to suit the mold.

A pipe 105 leads to the bottom of the cylinder 101 (see Fig. 11) for admitting air beneath the piston 100 to lift it and the neck pin after the table has turned to bring an empty mold into the first operating position. This pipe 105 is a branch of the pipe 58 which leads to the rear end of the table turning cylinder for returning the table turning piston to its normal position after it has completed rotating the table. Thus the piston 100 is raised to lift the neck pin 92 in the first operating position after the table has completed its rotation.

A pipe 106 leads to the top of the cylinder 101 for admitting air on top of the piston 100 to force it down and pull the neck pin out of the blank and clear of the neck ring after the "gather" has been blown down and packed in the mold. The pipe 106 is a branch of the pipe 59 which leads to the front end of the table turning cylinder for operating the table turning piston to turn the table. Thus the piston 100 is forced down and the neck pin is pulled out of the mold simultaneously with the admission of air to the cylinder 60 for turning the table to carry the filled mold to the second operation position; but as the table is heavy, and the yoke 97 and neck pin 92 are light, the latter will be withdrawn from the mold prior to the actual beginning of the rotation of the table. The size of the cylinder 101 and supply pipe 106 is such as to move the piston down quickly and jerk the neck pin out of the mold, thereby freeing it of the glass by a quick direct pull and lessening the likelihood of the glass checking or cracking in the neck of the blank.

*Funnel arm, cutter and blow head construction.*

The funnel arm 107 is supported upon the head frame 16 and projects from the column 11 horizontally over the mold in the first operation position. It is pivoted to a bracket 108 on the front side of the head frame 16 to tilt up and down. The rear end of the funnel arm extends through the column 11 (which has parallel slots extending up and down its front and back walls for the purpose), and its extremity is forked up to receive a link 109. The link is pivoted to the forked end of the funnel arm and connects it to the lower end of a piston rod which has a piston 110 on its upper end. The piston moves up and down in a cylinder 111 which is arranged over the rear end of the funnel arm and is supported on the back side of the head frame 16. Air is supplied by a pipe 112 to the bottom end of the cylinder for raising the piston and swinging down the front end of the funnel arm, and air is supplied by a pipe 113 to the top of the cylinder for driving down the piston and raising the front end of the funnel arm, as hereinafter described.

The vertically adjustable head frame, carrying the funnel arm and baffle plate, embraces the column and is split on one side and provided with a clamping nut 114 for clamping it in adjusted position on the column. Blocks 115, carried by the head frame, fit in the vertical slots in the front and back sides of the column to prevent the clamping nut from squeezing the sides of the column together and binding the funnel arm, which is guided up and down in the slots.

The funnel arm carries a funnel ring 116 which is loosely mounted in a hole in the funnel arm immediately above and in vertical alinement with the mold in the front position on the table, which is the first operating position. The funnel ring is suspended in the funnel arm by a flange 117 which fits loosely in an annular recess in the top of the funnel arm surrounding the hole for the funnel ring. (See Fig. 14.) The lower edge of the funnel ring is adapted to fit around the top of the mold and seat itself on the beveled shoulder 86, forming a tight joint therewith. Slight inaccuracy in the alinement of the mold and funnel arm will not prevent the funnel ring from seating itself concentrically with the top of the mold, because its loose fit permits the funnel ring to float freely and thus adjust itself sidewise in the funnel arm.

The funnel arm also carries a combined cutting-off slide and blow head 118 which is slidable in guides 119 arranged lengthwise of the funnel arm. The slide 118 has a hole through its end in alinement with the axis of the mold, and a cutting ring 120 is fitted in this hole to coöperate with the funnel ring 116 for cutting off the gather. The cutting ring and funnel ring are arranged one on the other in axial alinement with the mold in normal position. The slide 118 is provided with a chamber 121 in its rear end, and there are holes 122 in the bottom wall of this chamber. In normal position of the slide the holes 122 are closed by the top surface of the funnel arm on which the slide rests; but in the forward position of the slide the holes 122 register with the opening through the funnel ring into the top of the mold, and provide a means for blowing air down into the mold to pack the "gather" therein and insure a good finish for the neck of the blank. A flexible pipe 123 leads to the chamber 121 for supplying air thereto, as hereinafter described.

The slide 118 is moved forward and backward by means of a piston 124, to which it is connected at its rear end by a pin and connecting rod 125. The piston 124 is arranged in a horizontal cylinder 126 which is mounted on the rear portion of the funnel arm within the hollow column 11. Air is supplied to the ends of the cylinder 126 for operating the piston and slide by flexible hose pipes from the control valves beneath the table. The pipe 127 leads to the back end of the cylinder for driving the piston and slide forward to sever the gather; and the pipe 128 leads to the front end of the cylinder for returning the piston and slide to their normal positions, as hereinafter described.

The piston 124 is provided with extension portions 129 at its ends which fit into axial recesses in the ends of the cylinder 126 to prevent slamming at the ends of the stroke.

A stop block 130 is arranged in position on the end of the funnel arm to be engaged by the slide 118 at the end of the cutting stroke to cushion it. The stop block is slidably arranged in a cylinder 131, and normally held over toward the slide 118 by air pressure behind it from a pipe 132 connecting with the main air supply.

*Operation of the funnel arm and cutter slide.*

The funnel arm normally is held with its front end bearing down to clamp the funnel ring on the top of the mold. The telescoping pipe 112 which supplies air to the bottom of the cylinder 111 always has air pressure in it except when the table is turning or starting to turn. This pipe is a branch of the pipe 58 which conducts air to the rear end of the cylinder 60 for returning the table turning piston to normal position after completing the rotation of the table, and is under the control of the plunger valve 51. The flexible pipe 113 which supplies air to the top of the cylinder 111 for raising the front end of the funnel arm is a branch of the pipe 59, which conducts air to the front end of the cylinder 60 for rotating the table, and is also under the control of the plunger valve 51. Normally this pipe is open to the outflow pipe 63, but when the plunger valve is moved down by the controller piston 15 the outflow pipe is closed, and air is admitted to the pipes 59 and 113. Thus, whenever the plunger valve 51 drops for rotating the table, the forward end of the funnel arm will be raised; and when the table has completed a quarter turn and is locked in the next position the raised plunger valve 51 will admit air to the bottom of the cylinder 111 for again clamping down the funnel arm on the mold.

The cutter slide 118 is normally in its rearward position, and moves forward to sever the "gather" whenever the punty rod lever 20 is depressed. The operation of the punty trip valve 44 throws the main valve 31 to admit air to the top of the cylinder 14, and part of this air goes through the passage 133 in the cylinder head 25 and into the pipe 127, which leads through a passage in the head 17 of the intermediate section of the pedestal above the table and by means of a flexible hose connection to the rear end of the cylinder 126. The cutter slide is returned to its normal position when the main valve 31 is returned to its normal position by the operation of the table trip valve 42, part of the air from the main valve for lifting the piston 15 being led through the pipe 128, which branches off from the pipe 33, through a passage in the head 17 and by means of a flexible hose connection to the front end of the cylinder 126. Hence the movement of the cutter slide in each direction is controlled directly and effected immediately by the movement of the main valve during the beginning of the downward movement of the regulator piston 15, and in advance of the blowing and other operations controlled by the regulator piston. The speed of the regulator piston is adjusted to permit the cutter slide to move far enough to cut off the gather and seal the top of the funnel ring before admitting air to the blow head.

*Packing and blowing the blank.*

A pipe 134 from a port 135 in the side of the cylinder 14 near its top leads to the top end of the valve casing 53; and a pipe 123 leads away from the valve casing opposite the end of the pipe 134 for carrying air to the blow head 121. This pipe 123 leads through a passage in the head 17 of the intermediate section of the pedestal, and has a pipe and hose connection from the end of this passage in the top of the head 17 to the blow head chamber 121. When the piston 15 on its down stroke uncovers the port 135, air rushes through the pipes 134 and 123 to the blow head chamber, which by this time has moved over the mold, and blows into the mold on top of the molten glass therein and packs it into the mold to produce the desired finish of the neck and mouth. This blast of air through the blow head continues until the piston 15 approaches the end of its stroke and moves the valve 51 down to start the rotation of the table, when communication through the valve 51 between the pipes 134 and 123 is cut off, thereby preventing further blowing of air into the top of the mold to pack the gather.

As the table rotates to carry the mold from the first to the second operating position, the end of the passage 96 leading to the recess 81 in the table uncovers the end of the passage 137 in the head 17 of the intermediate section of the pedestal. The lower end of the passage 137 is connected by a branch pipe 138 to the pipe 28 which leads from the port 29 in the main valve casing. This port 29 is open to the air supply pipe 10 during the rotation of the table, and part of the air which blows through into the pipe 28 goes through the pipe 138 and passages 137 and 96 to the recess 81 in the table beneath the mold, from which it blows past the neck pin 92 into the open neck of the blank. This blowing follows quickly after the withdrawal of the neck pin, in order to keep the molten glass from collapsing during the rotation of the table to the second operating position where the final blowing of the blank in the blank mold takes place.

The quantity of air blown into the mold during its movement from the first to the second operating position can be regulated by adjusting the valve 139 in the pipe 138, and the quantity of air blown into the mold is adjusted so as not to expand the blank in the mold to any great extent. The air supply to the passage 137 is cut off as the table completes its movement by the main valve 31 returning to its normal position.

In the second operating position, the end of the passage 96 which leads to the recess 81 in the table registers with the end of the passage 140 in the head 17. A branch pipe 141 supplies air to the passage 140 from the pipe 58 which leads from the multiple valve 51 to the back end of the table turning cylinder 60. In normal position of the multiple valve 51, air from the supply pipe 61 is admitted to the pipe 58, and thus through the pipe 141 and passages 140 and 96 to the recess 81 in the table. This air blows into the neck of the mold in the second operating position to expand the blank to fill the mold, as shown in Fig. 6. The air pressure in the mold is maintained while the table is stationary, but when the multiple valve 51 drops to operate the table turning mechanism, the opening from the supply pipe 61 to the pipe 58 is closed and the pipe 58 is opened to the exhaust port 62. This permits the air in the passages 140 and 96 to escape through the exhaust port 62, so no more air will be blown into the blank, and part of the air in the blank also escapes. Following the escape of air from the blank, the baffle plate 21 can be raised from the top of the mold to permit rotation of the table without danger of blowing the blank out of the top of the mold; and air is admitted to the lower end of the cylinder 142 to raise the baffle plate by the dropping of the multiple valve 51 as hereinafter described.

*Baffle plate construction and operation.*

The baffle plate 21 which closes the top of the mold in the second operating position (the left hand position in Fig. 6) is recessed on its under side to conform to the top of the mold and to give the desired shape to the bottom of the blank. The outer edge of the baffle plate projects down and is flanged to fit over the beveled shoulder 86 around the top of the mold to center the baffle plate on the mold. The baffle plate is loosely attached to the lower end of a rod 143 by means of a disk 144 having two oppositely arranged circumferential flanges 145 projecting from its lower edge which can be inserted between and turned around under an upwardly projecting internal flange 146 which extends around three quarters of the circumference on the top of the baffle plate.

The disk 144 is supported by a flange on the lower end of the rod 143, and the upper end of the rod carries a piston 147 which operates in the cylinder 142 vertically arranged upon the back side of the head frame 16 on the column 11.

An air supply and exhaust pipe 148 leads to the top of the cylinder 142 for admitting air on top of the piston to clamp the baffle plate down on the top of the mold. An air supply and exhaust pipe 149 leads to the lower end of the cylinder 142 for admitting air beneath the piston to raise the baffle plate from the mold. The pipe 148 which leads to the top of the cylinder 142 joins the pipe 112 which leads to the bottom of the cylinder 111 for tilting down the front end of the funnel arm; and hence the baffle plate and funnel arm are both clamped down on the molds simultaneously upon the completion of the rotation of the table, and remain clamped down until the table is unlocked ready to move again. The pipe 149 which leads to the lower end of the cylinder 142 joins the pipe 113 which leads to the top of the cylinder 111 for raising the front end of the funnel arm; and hence the baffle plate will be raised clear of the mold simultaneously with the raising of the funnel arm, which occurs every time the table is unlocked for rotation, as heretofore described.

*Oiling and cooling devices.*

The rod 143 has a small hole 150 through it from end to end alining with a hole through the piston 147 to permit a fine stream of air to blow down from the top end of the cylinder 142 on to the top of the baffle plate for cooling it. The top of the baffle plate has a series of radial grooves 151 for distributing the air from the hole 150 over the surface of the baffle plate.

An oil drip cup 152 is mounted on the top of the column 11, and an oil pipe 153 leads from this oil cup down through the column to an oil hole in the top of the head 17 of the intermediate section of the pedestal. This oil hole leads to an oil groove 154 in the cylindrical outer wall of the head 17 for lubricating the bearing between it and the table, as shown in Fig. 16. Some of the oil from the cup 152 finds its way down into the ball bearing 19 which supports the table.

The piston 15 and cylinder 14 are lubricated from an oil cup 155 on the cylinder 14. The main valve 31 is lubricated through oil plugs 156 in the top wall of the cylinder 30 near its ends; and the piston 64 and cylinder 60 which turn the table are lubricated through similar oil plugs 157 in the upper side of the cylinder casing. The cylinder 111 and piston for tilting the funnel arm are lubricated by means of an oil cup 158 on the top of the cylinder. The cylinder 126 and piston for reciprocating the cutting-off slide are lubricated through the air supply pipe 127 leading to the end of the cylinder. This cylinder 126 is provided with a bronze bushing 159 for reducing the friction of the piston and preventing wear. An oil cup 160 is mounted on the top of the cylinder 142 for lubricating it. The cylinder 101 and piston for operating the neck pin are lubricated by means of an oil cup 161 on the air pipe 106 leading to the top end of the cylinder.

An oil reservoir 162 for light oil for spraying in the molds and cutter is mounted on the head frame 16. The oil for spraying the molds is led from the reservoir through a pipe 163 to a point over the open top of the mold in the fourth operating position (the left-hand position in Fig. 1). A pipe 164, which leads from the casing of the punty trip valve 44 below the valve seat, joins the oil pipe 163 near its orifice and blows a stream of air through the end of the oil pipe to spray oil into the mold beneath every time the punty trip valve is operated.

The oil for spraying the cutter slide and cutter ring is led from the reservoir 162 through a pipe 165 to a point over the funnel arm above the cutter ring 120 in its normal position. A pipe 166 which is a branch of the outflow pipe 63 from the plunger valve casing 53, joins the oil pipe 165 near its orifice and blows air through the end of the oil pipe to spray oil on to the cutter slide and cutter after each operation of the plunger valve to return the operating pistons for the table turning device, neck pin, baffle plate, cutter slide and funnel tilting device to their normal positions. Needle valves 167 are arranged in the oil pipes 163 and 165 to regulate the amount of oil sprayed into the molds and on to the cutter slide.

It appears from the foregoing description that the machine is almost entirely automatic in its operation, the only manual operations required being charging the glass into the molds, tripping the valve for cutting off the glass, and opening and closing the molds and removing the finished blank therefrom. The speed of operation of the machine is under the control of the workman; and the length of time and pressure of the blowing operations are likewise under the control of the workman. Safeguards are provided for preventing the operation of the starting valve by the workman to shift the operating valve during the period when the machine is performing its automatic operations; and, moreover, all of the automatic operations are safeguarded so that they cannot take place out of their proper time. The shearing and blowing operations performed automatically by the machine, and the automatic rotation of the table in synchronism therewith, enable the machine to produce blanks as fast as the workman can gather glass on a punty rod and charge it into the molds, one boy being required for opening the molds, removing the completed blanks and transferring them to a bottle blowing machine, and closing the molds.

It is apparent that changes in the construction and arrangement of the various parts of the machine can be made to suit manufacturing expediency and to adapt the machine to divers conditions and articles of manufacture; and the invention is not restricted to the particular parts and the arrangement of parts shown and described.

I claim the following as my invention:

1. In a glass blowing machine, a funnel, a blow head including a plate having a gather receiving opening normally registering with the funnel, the walls of the opening and funnel coöperating to constitute gather shearing means.

2. In a glass blowing machine, a funnel, a blow head including a plate slidably mounted on the funnel and having a gather receiving opening normally registering with the interior of the funnel, the walls of said opening and funnel coöperating to constitute gather shearing means, and means for sliding the plate relative to the funnel.

3. In a glass blowing machine, a mold, a combined blow head and shearing element located opposite the bottom forming end thereof, means for sliding said element into and out of active position, and means for closing the blow head when in inactive position, said means constituting a support for the blow head.

4. In a glass blowing machine, a mold, a combined blow head and cut-off located opposite the bottom forming end thereof, a tiltable support therefor, means for sliding said combined blow head and cut-off along the support into and out of active position, said support constituting means for closing the blow head when in inactive position.

5. In a glass blowing machine, a mold, a supporting element, a combined blow head and cut-off slidably mounted thereon located opposite the bottom forming end thereof, pressure operated means normally holding the blow head and cut-off in inactive position, said blow head being closed by the support when in inactive position, and means for shifting the pressure upon said pressure operated means for sliding the combined blow head and cut-off to active position.

6. A glass blowing machine including a tiltable support, pressure operated means for holding the support normally in active position, a combined blow head and cut-off slidably mounted on the support, said blow head and cut-off normally being in inactive position, pressure operated means for shifting said blow head and cut-off to active position, pressure operated means for withdrawing said blow head and cut-off from active position, and means controlled by the means for shifting said blow head and cut-off for relieving the tiltable support of the pressure holding it in active position and swinging said support out of active position.

7. In a glass blowing machine, a pivoted support adapted to coöperate with a mold, pressure operated means for holding the support normally in active position for coöperating with a mold, a combined blow head and cut-off slidably mounted on the support, pressure operated means for shifting said combined blow head and cut-off into active position, means for changing the pressure upon said pressure operated means to shift the combined blow head and cut-off out of active position, and means operated by said means for changing the pressure for relieving the support of its controlling pressure and shifting it to inactive position.

8. In a glass blowing machine, the combination with a pivoted support, and a pressure controlled piston for holding the support normally in lowered position, of a combined blow head and cut-off slidably mounted on the support, a piston connected thereto, means for directing pressure against the piston to hold the combined blow head and cut-off in inactive position, manually controlled means for shifting the pressure upon the last named piston thereby to move the combined blow head and cut-off to active position and operate the blow head, separate means operated by said shifting of pressure for automatically cutting off the pressure to the first named piston and for cutting off air from the blow head, respectively, and means for automatically shifting said piston when relieved of pressure to tilt the support and elevate the blow head.

9. In a glass blowing machine, the combination with a tiltable support, of a blow head slidably mounted thereon, means for directing air thereto, a pressure pipe, a piston connected to the tiltable support, means for directing pressure from the pressure pipe to the piston for holding the support normally in lowered position, a cap or baffle plate, means controlled by the pressure in said pipe for holding the cap normally in lowered position, a piston connected to the blow head, means for directing pressure normally against the piston to hold the blow head in inactive position, manually operated means for changing the pressure upon said piston to shift the blow head to active position, separate means controlled by the shifting of said pressure for cutting off the pressure in the pressure pipe and in the blow head, respectively, and separate means released by said cutting off of pressure for simultaneously lifting the cap and tilting the support respectively, thereby to raise the blow head.

10. In a glass blowing machine, the combination with a tiltable support, of a blow head slidably mounted thereon, a pressure supply pipe, means for admitting air to the blow head from said pressure pipe, a piston connected to the tiltable support, means for directing pressure from the pressure pipe to the piston for holding the support normally in lowered position, a baffle plate or cap, means controlled by the pressure in said pipe for holding the cap normally in lowered position, a piston connected to the blow head, means for directing pressure normally against the piston to hold the blow head in inactive position, manually operated means for changing the pressure upon said blow head piston to shift the blow head to active position, means controlled by the shifting of said pressure for cutting off the pressure from the pressure pipe to the blow head, separate means released with said cutting off of pressure for simultaneously lifting the cap and tilting the support to raise the blow head, and means for automatically shifting the blow head to inactive position when raised.

11. In a fluid pressure operated glass blowing machine, a table mounted for rotation, blank molds supported thereby, a tiltable support, means operated by fluid pressure for holding the support normally in lowered position and upon a blank mold, a blow head slidably mounted upon the support and closed thereby when the blow head is in inactive position, means for directing air to the blow head, fluid pressure operated means for holding the blow head normally in inactive position, manually operated means for shifting the pressure upon said last named fluid pressure operated means for moving the blow head to active and open position, separate means controlled by said shifting of fluid pressure for cutting off the pressure from the blow head, means for automatically moving the support to elevate the blow head when the pressure is cut off, and means operated by the rotation of the table for automatically restoring normal pressures.

12. In a fluid pressure operated glass blowing machine, a table mounted for rotation, a series of blank molds carried by the table, a latch for holding the table when any one of the molds is brought to its first or receiving position, a tiltable support, a blow head carried thereby, a source of fluid means operated by fluid pressure for holding the support normally in position on the blank mold in the first position, a valve for controlling the admission of pressure to said support holding means, pressure operated means for shifting the blow head into active position upon the support, means for automatically unlocking the table and cutting off pressure from said support holding means immediately subsequent to movement of the blow head to active position, means for automatically shifting the support to elevate the blow head from the blank mold when the table is unlatched, said table being revoluble to position another blank mold for engagement by the blow head support, said table and latch coöperating to keep the pressure cut off from said blow head and tiltable support until a mold is brought into proper position for engagement by the support, and means for automatically shifting the latch into engagement with the table when the blank mold is properly positioned, thereby to open the valve and restore normal pressure to the support holding means and the parts communicating therewith.

13. In a glass blowing machine, a table mounted for rotation, a series of blank molds carried by the table, a latch for holding the table when any one of the molds is brought to its first or receiving position, a tiltable support, a blow head carried thereby, means for supplying air thereto, a pressure pipe, means operated by pressure in said pipe for holding the support normally in position on the blank mold in the first position, a valve for controlling the admission of pressure to said pressure pipe, a valve for controlling the admission of air to the blow head, pressure operated means for shifting the blow head into active position upon the support, separate means for automatically unlocking the table and closing the valve of the pressure pipe, and for closing the valve of the blow head, respectively, immediately subsequent to such movement of the blow head to active position, means for automatically shifting the support to elevate the blow head from the blank mold when the pressure pipe is closed, said table being revoluble to position another blank mold for engagement by the blow head support, said table and latch coöperating to hold the valve in the pressure pipe closed until a mold is brought into proper position for engagement by the support, means for automatically shifting the latch into engagement with the table when the blank mold is properly positioned, thereby to open the valve and restore normal pressure within the pressure pipe and the parts communicating therewith, and means operated by the rotation of the table for placing the interior of the first mentioned blank mold in communication with the pressure pipe to blow the contents of the mold, a cap or baffle plate, and means operated by the pressure in said pipe for applying the cap to said first mentioned mold simultaneously with the blowing of the contents of the mold.

14. In a glass blowing machine, a pedestal including superposed hollow cylinders, a table mounted for rotation on the pedestal, blank molds movable with the table, connected members reciprocating within the respective cylinders, a locking bolt engaging the table to hold it against movement when any one of the blank molds is brought to one position, a pressure pipe, a valve therein and held normally in open position by the bolt, a blow head, a pivoted support therefor, means for supplying air to the blow head, means operated by pressure in said pressure pipe for holding the support normally lowered in position upon the blank mold adjacent thereto, pressure operated means for holding the blow head in inactive position upon the support, means for shifting said pressure to simultaneously move the blow head to active position and direct the reciprocating members downwardly within their cylinders, separate means operated by one of said reciprocating members during such movement to unlock the table and close the valve in the presssure pipe and to close the air supply to the blow head, respectively, said table constituting means for preventing the upward movement of the table lock and the opening of the valve until another blank mold is brought to said first mentioned position, means for automatically shifting the support to lift the blow head from the blank mold when pressure is cut off from the pressure pipe, means operated by the rotation of the table for automatically returning the reciprocating members to their initial positions and shifting the blow head to its inactive position while the support is raised, said locking bolt operating automatically to lock the table and to open the valve in the pressure pipe thereby to restore normal pressure in said pipe and lower the blow head when a blank mold is brought into pre-determined position adjacent thereto.

15. In a glass blowing machine, a pedestal including superposed hollow cylinders, connected members mounted for reciprocation therein, a table mounted for rotation on the pedestal, blank molds carried by the table, a blow head support, a pressure pipe, a valve therein, means in communication therewith for holding the support normally lowered in position upon a blank mold, a blow head movably mounted on the support, a valved pipe for supplying air thereto, a locking bolt normally engaging the table to hold it against rotation, and to hold the valve in the pressure pipe in open position to maintain pressure within said pipe, manually controlled means for directing pressure against one of the connected members to lower said members and at the same time shift the blow head to active position upon its support, separate means operated by said movement of the connected members for unlocking the table and closing the valve in the pressure pipe, and for closing the valved pipe to the blow head, respectively, means for automatically opening said valved pipe, means for releasing the pressure within the pressure pipe for automatically shifting the blow head support upwardly away from the blank mold, means operated by the rotation of the table for automatically returning the blow head to its inactive position, and means for automatically shifting the locking bolt into engagement with the table and opening the valve in the pressure pipe to restore pressure therein when another blank mold is brought into position for engagement by the blow head support.

16. The combination with a pedestal including superposed cylinders, a piston mounted to work within one of said cylinders and connected to a reciprocating member in the other cylinder, of a table mounted for rotation upon the pedestal, blank molds carried thereby, there being a recess in the table in communication with the bottom of each blank mold, there being a port in one of the cylinders in communication with the recess under a blank mold between its first and second operating positions, a blow head support, a pressure pipe, a blow head, pressure operated means for holding the blow head normally in inactive position, and manually operated means for shifting the pressure to move the blow head and direct the piston downwardly, said piston operating after the blow head has reached active position to admit air through said blow head into the upper end of the blank mold, said port constituting means for admitting air pressure through the recess in the table into the lower end of a blank mold during the rotation of said table from its first to its second operating position.

17. In a glass blowing machine, the combination with a controller cylinder, a controller piston mounted to work within the cylinder, a table arranged to rotate around the cylinder, and a blank mold upon the table, there being communication between the bottom of the blank mold and a recess in the table, a passage connecting said recess with a port in the table turning around the exterior of said cylinder, of a blow head support, a blow head normally in inactive position thereon, valve controlled means for directing pressure against the piston to shift it in one direction and to move the blow head to active position, the movement of the piston admitting air from the cylinder to the blow head, and the movement of the table admitting air to the bottom of the blank mold.

18. The combination with a pedestal including a cylinder, a piston mounted to work within the cylinder, a table mounted for rotation upon the pedestal, and a blank mold upon the table, of a neck pin slidably mounted in the table, means operated by the rotation of the table for successively moving the neck pin into and out of the bottom portion of the blank mold, means for establishing communication between the bottom portion of the blank mold and said cylinder when the table is in one position, a blow head, means for admitting air pressure to the cylinder to operate the piston, separate means operated by the air which operates the piston for applying the blow head to the upper end of the blank mold, the movement of said piston admitting air to the blow head to pack a gather in the mold, and means to force air into the bottom of the mold from the cylinder communicating therewith after the withdrawal of the neck pin.

19. In a glass blowing machine, a pedestal, a table mounted for rotation thereon, a blank mold on the table, a neck pin slidably mounted in the table, air passages extending downwardly through the lower portion of the blank mold, there being a recess in the table with which the passages communicate, a stem depending from the neck pin, means in the path of the stem for successively raising and lowering the neck pin independently of the rotation of the table, and means for establishing communication between the recess in the table and the port in the pedestal when the table is brought to intermediate position following the lowering of the pin from its highest point.

20. The combination with a pedestal, of a table mounted for rotation thereon, blank molds revoluble with the table with their bottom forming ends uppermost, there being passages in the table communicating with the bottom portions of the respective blank molds and there being ports in the pedestal adapted successively to register with the respective passages in the table, and pressure operated means for directing air under pressure through each of the ports and into the said passages as they are brought successively into register with said ports whereby the contents of the mold are blown twice without substantial release of pressure intervening.

21. The combination with a pedestal, of a table mounted for rotation thereon, blank molds revoluble with the table, there being passages in the table communicating with the bottom portions of the respective blank molds and there being ports in the pedestal adapted to successively register with the respective passages in the table, one of the ports constituting the main air inlet for blowing each blank mold when it is brought to a fixed position, and the other port constituting a secondary air inlet adapted to deliver air in sufficient quantity to prevent collapse of the blank while the table is moving to said fixed position, means for directing air under pressure through said ports and into said passages as they are brought successively into registering position, thereby to blow twice the contents of the mold, and means for locking the table against movement when a blank is brought to either of said fixed positions.

22. The combination with a pedestal, of a table mounted for rotation thereon, blank molds revoluble with the table, there being passages in the table communicating with the bottom portions of the respective blank molds, there being a main blowing port and an auxiliary blowing port in the pedestal adapted to successively register with the respective passages in the table, the auxiliary port constituting an air inlet when each blank is brought to register with a first position, means for limiting the amount of air delivered through said port, means for directing air under pressure for the main blowing operation through the other port and into the said passages as they are brought successively to a second position, whereby the contents of each mold are first partially blown and then fully blown in quick succession, being meanwhile supported against collapse, and means for locking the table against movement when a blank mold is brought to the second of said positions, and pressure operated means for unlocking the table.

23. The combination with a pedestal, of a table mounted for rotation thereon, blank molds revoluble with the table, there being passages in the table communicating with the bottom portions of the respecive blank molds, there being a main blowing port and an auxiliary blowing port in the pedestal adapted to successively register with the respective passages in the table, the auxiliary port constituting an air supply when each blank mold is brought to register therewith, means for limiting the amount of air delivered through said port, means for directing air under pressure for the main blowing operation through said port, and means for directing air under pressure into the said passages as they are brought successively to position, whereby the contents of each mold are first partially blown and then fully blown in quick succession, being meanwhile supported against collapse, means for locking the table against movement when a blank mold is brought to either of said registering positions, pressure operated means for unlocking the table upon the completion of the blowing operation, pneumatic means for applying a blow head to the upper end of each blank mold before it registers with the first named port, and means operated by the unlocking of the table for cutting off pressure from the blank mold and from the blowing port.

24. The combination with a pedestal, of a table mounted for rotation thereon, blank molds revoluble with the table, there being passages in the table communicating with the bottom portions of the respective blank molds, there being a main blowing port and an auxiliary blowing port in the pedestal adapted to successively register with the respective passages in the table, the auxiliary port constituting an intermediate blow when each blank mold is brought to one position, means for limiting the amount of air delivered through said port, means for directing air under pressure for the main blowing operation through the other port and into the said passages as they are brought successively to a second position, whereby the contents of each mold are first partially blown and then fully blown in quick succession, being meanwhile supported against collapse, means for locking the table against movement when a blank mold is brought to the latter of said positions, pressure operated means for unlocking the table upon the completion of the blowing operation, pneumatic means for applying a blow head to the upper end of each blank mold when brought to the first named position, and means operated by the unlocking of the table for cutting off pressure from the blank mold and from the blowing port, said table constituting means for holding pressure cut off until another blank mold is brought to the first position.

25. In a glass blowing machine, a tiltable support, means for automatically shifting the support to position upon a mold, a funnel carried by the support for directing a gather of glass into a mold, a shearing element having a gather receiving opening adapted to register with the opening in the funnel, opposed portions of the walls of the opening in the funnel and the opening in the shearing element, respectively, coöperating to cut a gather suspended in the funnel, and means for shifting the shearing element relative to the tiltable support.

26. In a glass blowing machine, a supporting element, a gather receiving funnel carried thereby, a shearing element and blow head slidably mounted on the funnel and having a gather receiving opening, pressure operated means normally holding the shearing element and blow head in position with the opening registering with the funnel, and means for shifting the pressure upon said pressure operated means for moving the shearing element and blow head to sever a gather between opposed portions of the walls of the funnel and gather receiving opening respectively and bring the blow head to position to press the glass cut off by the shearing element into the form of a blank.

27. In a glass blowing machine, a tiltable support, pressure operated means for holding the support normally in lowered position, a shearing element slidably mounted on the support, pressure operated means for holding the shearing element normally in inactive position, means for shifting the pressure upon said pressure operated means for moving the shearing element to active position upon its support, and means controlled by the shifting of said pressure, for relieving the support of the pressure and swinging said support out of active position.

28. A glass blowing machine comprising a mold, a funnel support positioned over the mold, a funnel loosely mounted in said support for lateral adjustment to fit over the mold, a blow head mounted on said funnel support adapted for movement across said funnel to close it, means for conducting air to said blow head, and means for clamping said funnel support, blow head and funnel down on said mold.

29. A glass blowing machine comprising a mold, a funnel support positioned over the mold, a funnel loosely mounted in said support for lateral adjustment to fit over the mold, a slide mounted on said funnel support for movement across said funnel, the top of said funnel and bottom of said slide having cutting edges, a blow head mounted on said slide and adapted to register with said funnel at the end of the cutting movement of the slide, means for conducting air to said blow head, and means for clamping said funnel support, blow head and funnel down on said mold.

30. A glass blowing machine comprising a mold, a funnel support positioned over the mold, a funnel loosely mounted in said support for lateral adjustment to fit over the mold, a slide mounted on said funnel support for movement across said funnel, the top of said funnel and bottom of said slide having cutting edges, and means for clamping said funnel support, blow head and funnel down on said mold, said clamping means holding said funnel and slide in sliding contact in all positions of lateral adjustment of said funnel.

31. A glass blowing machine comprising a mold, a funnel support positioned over the mold, a funnel loosely mounted in said support for lateral adjustment to fit over the mold, a blow head mounted on said funnel support adapted for movement across said funnel to close it, means for conducting air to said blow head, and means for clamping said funnel support, blow head and funnel down on said mold, said clamping means holding said funnel and blow head in contact to provide an air tight joint between them in all positions of lateral adjustment of said funnel.

32. A semi-automatic glass blowing machine operated by fluid pressure comprising an operating valve, a manually operated trip valve for shifting said operating valve to start the cycle of operations, a cylinder for operating the machine, and means associated with said cylinder for cutting off air pressure from said trip valve when said machine is operating, whereby said trip valve cannot be manually operated to shift said operating valve when said machine is operating.

33. A glass blowing machine operated by fluid pressure comprising a gather shearing device, an operating valve, a trip valve for shifting said operating valve to start the operation of said shearing device, a cylinder for operating the machine, and means associated with said cylinder for cutting off air pressure from said trip valve when said shearing device is operating, whereby said trip valve cannot operate to shift said operating valve when said shearing device is operating.

34. A glass blowing machine operated by fluid pressure comprising a blow head and means for supplying air thereto for blowing into a mold, an operating valve, a trip valve for shifting said operating valve to operate said blow head, a cylinder for operating the machine, and means associated with said cylinder for cutting off air pressure from said trip valve when said air supplying means is operating, whereby said trip valve cannot operate to shift said operating valve when said air supplying means is operating.

35. A glass blowing machine operated by fluid pressure comprising a rotatable table, automatic devices for rotating said table, an operating valve, a trip valve for shifting said operating valve, to start the operation of said automatic devices, a cylinder coöperating with said automatic devices for rotating the table, and means associated with said cylinder for cutting off air pressure from said trip valve when said cylinder is operating, whereby said trip valve cannot operate to shift said operating valve when said table is rotating.

36. A glass blowing machine operated by fluid pressure comprising a rotatable table, molds arranged thereon, automatic devices coöperating with said molds, automatic devices for shifting said mold coöperating devices away from said molds and rotating said table, and automatic means for returning said devices to normal position after the table has stopped rotating, an operating valve, a trip valve for shifting said operating valve to start the operation of said automatic devices, a cylinder coöperating with said automatic devices for rotating the table and returning said devices to normal position, and means associated with said cylinder for cutting off air pressure from said trip valve when said cylinder is operating, whereby said trip valve cannot operate to shift said operating valve when said automatic devices and means are out of normal position.

37. A glass blowing machine, comprising a rotatable table, a mold carried thereby, a funnel having a closure and shear associating therewith, an operating valve, a regulator, means to set the operating valve for admitting air to operate the shear and to close the funnel, said operating valve also admitting air to operate said regulator, means controlled by said regulator for blowing air through said funnel into the mold, means controlled by said regulator for shutting off said air from said mold and turning the table, and means controlled by the movement of said table for resetting said operating valve in normal position.

38. A glass blowing machine, comprising a rotatable table, a mold carried thereby, a funnel having a closure and shear associated therewith, an operating valve, a regulator, means to set the operating valve for admitting air to operate the shear and to close the funnel, said operating valve also admitting air to operate said regulator, means controlled by said regulator for blowing air through said funnel into the mold, means controlled by said regulator for shutting off said air from said mold and turning the table, means controlled by said operating valve for blowing air through said table into the bottom of the mold during the rotation of the table, and means controlled by the movement of said table for resetting said operating valve in normal position.

39. A glass blowing machine, comprising a rotatable table, a mold carried thereby, a funnel having a closure and shear associated therewith, an operating valve, a regulator, means to set the operating valve for admitting air to operate the shear and to close the funnel, said operating valve also admitting air to operate said regulator, means controlled by said regulator for blowing air through said funnel into the mold, means controlled by said regulator for shutting off said air from said mold and turning the table, means controlled by said operating valve for blowing air through said table into the bottom of the mold during the rotation of the table, a table locking device, and means controlled by the movement of said table for resetting said operating valve in normal position and operating said table locking device.

40. A glass blowing machine, comprising a rotatable table, a mold carried thereby, a funnel having a closure and shear associated therewith, an operating valve, a regulator, means to set the operating valve for admitting air to operate the shear and to close the funnel, said operating valve also admitting air to operate said regulator, means controlled by said regulator for blowing air through said funnel into the mold, means controlled by said regulator for shutting off said air from said mold and turning the table, means controlled by said operating valve for blowing air through said table into the bottom of the mold during the rotation of the table, a table locking device, means controlled by the movement of said table for resetting said operating valve in normal position and operating said table locking device, a second closure for said mold, and means controlled by said table locking device for operating said second closure to close the top of the mold and for blowing air through the table into the bottom of said mold after said table has completed its turning movement.

41. A glass blowing machine comprising a rotating table and a series of molds arranged thereon for simultaneous operation, said molds having open tops to receive the gather, a regulator, means controlled by the regulator for blowing air into the top of a mold, means for locking the table during the air blowing, said table locking means being under the control of said regulator for unlocking the table at the end of the blowing, and a control device for said regulator for blowing air into the top of a mold a length of time which can be adjusted to suit the working conditions.

42. A glass blowing machine comprising a rotatating table and a series of molds arranged thereon for simultaneous operation, said molds having open tops to receive the gather, a cutting device for severing the gather, an operating valve, means for setting the operating valve to operate the cutting device, a regulator operated by the operating valve, means controlled by the regulator for blowing air into the top of a mold, means for locking the table during the cutting operation and air blowing, said table locking means being under the control of said regulator for unlocking the table at the end of the blowing, and a control device for said regulator for blowing air into the top of a mold a length of time which can be adjusted to suit the working conditions.

43. A glass blowing machine comprising a rotating table and a series of molds arranged thereon for simultaneous operation, said molds having open tops to receive the gather, a cutting device for severing the gather, an operating valve, means for setting the operating valve to operate the cutting device, a regulator operated by the operating valve, means controlled by the regulator for blowing air into the top of a mold, means for locking the table during the cutting operation and air blowing, said table locking means being under the control of said regulator for unlocking the table at the end of the blowing, means for rotating the table under the control of said table locking means, and means for resetting the operating valve upon the completion of the movement of said table, said operating valve thereby returning the regulator to normal position, and a control device for determining the speed of said regulator and regulating the speed of operation of the machine to suit the working conditions.

44. A glass blowing machine, a regulator for timing the operation of the blowing devices, adjustable means for controlling the speed of movement of said regulator, an operating valve for operating said regulator, means for throwing said operating valve to start the operation of the machine, and means set in operation by devices under the control of said regulator for throwing said operating valve to restore said regulator and devices controlled thereby to normal position.

45. A glass blowing machine comprising a rotatable mold support, a locking device for holding said mold support in operating position, a shaft for rotating said mold support in one direction, means for rotating said shaft comprising a reciprocating member operated by fluid pressure, a valve for controlling the operation thereof, and a clutch and gearing associated therewith controlled by said locking device for operatively connecting said shaft and mold support when said locking device is out of locking position, said valve being reversed and said clutch being thrown out of engagement by said locking device when the latter is moved into locking position, whereby said reciprocating member is returned to normal position without rotating said table.

46. A glass blowing machine comprising a rotatable mold support, a locking device for holding said mold support in operating position, a shaft for rotating said mold support in one direction, means for rotating said shaft comprising a reciprocating member, and a clutch and gearing associated therewith controlled by said locking device for operatively connecting said shaft and mold support when said locking device is out of locking position, said clutch being thrown out of engagement by said locking device when the latter is moved into locking position, whereby said reciprocating device can return to normal position without rotating said table, and adjustable stops at the ends of the path of movement of said reciprocating member for regulating the angle of rotation of said mold support.

47. A rotatable member adapted for intermittent rotation, in combination with means for rotating it and holding it stationary in alternation, said means comprising a locking member, an operating cylinder and valve for admitting air to one end or the other of said cylinder, a piston in said cylinder, and rack and gear connections comprising a clutch between said piston and rotatable member for rotating it, said valve and locking member being connected for simultaneous movement and having means for operating said clutch.

48. A rotatable member adapted for intermittent rotation, in combination with means for rotating it and holding it stationary in alternation, said means comprising a locking member, an operating cylinder and valve for admitting air to one end or the other of said cylinder, a piston in said cylinder, and rack and gear connections between said piston and rotatable member for rotating it, said valve and locking member being connected for simultaneous movement, and means operated by said locking member for disconnecting said connections between said piston and rotatable member when said locking member is in locking position.

49. A glass blowing machine having a movable mold support, a locking member normally engaging with said mold support for holding it stationary, a piston carrying a member adapted to engage and move said locking member out of engagement with said mold support, means for controlling the movement of said piston, a valve operated by the movement of said piston, and means controlled by said valve for moving said mold support, said mold support having means for actuating the means for controlling said piston to move said piston out of engagement with said locking device to permit it to return to normal position and hold said mold support stationary, said movement of said piston out of engagement with said locking means operating said valve to stop the movement of said mold support.

50. A glass blowing machine having a movable mold support, molds carried thereby, devices mounted on said machine for coöperating with said molds, a locking member normally engaging with said mold support for holding it stationary, a piston carrying a member adapted to engage and move said locking member out of engagement with said mold support, means for controlling the movement of said piston, a valve operated by the movement of said piston, means controlled by said valve for operating said devices and for withdrawing them from said molds, and means controlled by said valve for moving said mold support, said mold support having means for actuating the means for controlling said piston to move said piston out of engagement with said locking device to permit it to return to normal position and hold said mold support stationary, said movement of said piston out of engagement with said locking means operating said valve to stop the movement of said mold support and move said devices into operative position.

51. A combined shear and blow head for a glass blowing machine, comprising a movable support, a slide arranged in guides on said support, said slide carrying a shear and a blow head, means for shifting said slide to operate said shear, and means for cushioning the slide at the end of its shearing movement.

52. A combined shear and blow head for a glass blowing machine, comprising a movable support, a slide arranged in guides on said support, said slide carrying a shear and a blow head, means for shifting said slide to operate said shear, and a cylinder arranged at the end of said support containing a piston with a portion projecting out into the path of movement of the slide for cushioning the slide at the end of its shearing movement.

53. In a glass blowing machine, in combination with a vertical mold, a vertically movable blow head adapted to seat upon the bottom forming end of said mold, a movable cut-off for said blow head, and means for moving said blow head and cut-off, said blow head and cut-off having communicating passages for conducting fluid pressure to said mold.

54. In a glass blowing machine, in combination with a mold having an open bottom forming end, a blow head adapted to be applied to said mold to close the open end, said blow head having a universal joint whereby it can seat upon said mold, and a cut-off for said blow head, said blow head and cut-off having coöperating means for conducting fluid pressure to said mold.

55. In a glass blowing machine, in combination with a mold and means for moving it horizontally, a vertically movable blow head opposite the open bottom forming end of said mold and comprising a body having a glass receiving aperture, a tubular head connected to said body under said aperture, means for forming a universal joint between the top of said mold and the lower face of said tubular head, a cut-off slide, said slide and frame having communicating passages whereby fluid pressure is conducted to said mold, together with means for raising and lowering said blow head with reference to the mold.

Signed at St. Louis, Missouri, this 20th day of September, 1916.

JAMES W. LYNCH.